(12) United States Patent
Kurotsu et al.

(10) Patent No.: US 7,538,902 B2
(45) Date of Patent: May 26, 2009

(54) PRINT CONTROL PROGRAM AND INFORMATION PROCESSING APPARATUS

(75) Inventors: Noriyoshi Kurotsu, Kanagawa (JP); Masamichi Ohshima, Tokyo (JP); Hidekazu Morooka, Kanagawa (JP); Takashi Yagita, Kanagawa (JP); Koichiro Wanda, Kanagawa (JP); Koji Kikuchi, Kanagawa (JP); Kei Kitagata, Kanagawa (JP); Hiroyuki Kayama, Kanagawa (JP); Kenichi Shirai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 885 days.

(21) Appl. No.: 10/774,473

(22) Filed: Feb. 10, 2004

(65) Prior Publication Data

US 2004/0156069 A1    Aug. 12, 2004

(30) Foreign Application Priority Data

Feb. 12, 2003   (JP)   ............................. 2003-034345

(51) Int. Cl.
*G06K 15/00* (2006.01)
(52) U.S. Cl. .................................... 358/1.16; 358/1.13
(58) Field of Classification Search ........... 358/1.1–1.9, 358/1.11–1.18; 713/300; 714/18; 235/432.156
See application file for complete search history.

(56) References Cited

U.S. PATENT DOCUMENTS

| | | | | |
|---|---|---|---|---|
| 5,287,434 A | * | 2/1994 | Bain et al. ............. | 235/462.15 |
| 6,115,132 A | * | 9/2000 | Nakatsuma et al. ........ | 358/1.14 |
| 6,594,033 B1 | * | 7/2003 | Kujirai et al. .............. | 358/1.18 |
| 6,906,821 B1 | * | 6/2005 | Hanazono et al. .......... | 358/1.16 |
| 2002/0030851 A1 | | 3/2002 | Wanda ....................... | 358/1.15 |
| 2002/0054321 A1 | | 5/2002 | Kikuchi ..................... | 358/1.15 |
| 2003/0046314 A1 | | 3/2003 | Morooka .................... | 707/500 |
| 2003/0053082 A1 | | 3/2003 | Tomito et al. ............... | 358/1.2 |
| 2003/0053105 A1 | | 3/2003 | Morooka et al. ........... | 358/1.13 |
| 2003/0053106 A1 | | 3/2003 | Kuroda et al. .............. | 358/1.13 |
| 2003/0225821 A1 | | 12/2003 | Wanda ....................... | 709/201 |
| 2004/0160613 A1 | | 8/2004 | Kurotsu et al. .............. | 358/1.1 |

FOREIGN PATENT DOCUMENTS

| | | |
|---|---|---|
| JP | 8-090845 | 4/1996 |
| JP | 2002-196916 | 7/2002 |
| JP | 2002-318778 | 10/2002 |

\* cited by examiner

*Primary Examiner*—King Y Poon
*Assistant Examiner*—Lennin R Rodriguez
(74) *Attorney, Agent, or Firm*—Fitzpatrick, Cella, Harper & Scinto

(57) ABSTRACT

A print control program, which is executed by an information processing apparatus so as to transmit print data to an image-forming device and record an image, causes the information processing apparatus to re-spool as a second spool file print data that has already been spooled once as a first spool file by an operating system. A portion of the print data that is re-spooled as the second spool file is transmitted to the image-forming device during re-spooling. As result, spooling of the second spool file linked to the first spool file, and transmission to the image-forming device, is more efficient.

18 Claims, 17 Drawing Sheets

FIG. 9

PRINT

PRINTER
- PRINTER NAME (N): PRINTER NAME E
- STATUS: IDLING
- TYPE: PRINTERE
- LOCATION: Proxy Output Port E ~ 901
- COMMENT:

☐ OUTPUT TO FILE (L)

[PROPERTIES (P)]

PAGE RANGE
- ○ ALL (A):
- ○ CURRENT PAGE (E):
- ○ SELECTION (S):
- ○ PAGES (G):

ENTER PAGE NUMBER AND/OR PAGE RANGES, SEPARATED BY COMMAS. FOR EXAMPLE, 1, 3, 6 OR 4-8.

NUMBER OF COPIES
- COPIES (C): 1
- ☐ COLLATE (T)

ENLARGE/REDUCE
- NUMBER OF COPIES PER PAGE (H): 1 PAGE
- SPECIFY PAPER SIZE (Z): NO ENLARGEMENT SPECIFIED

PRINT WHAT (W): DOCUMENT
PRINT DESIGNATION (R): ALL PAGES

[OPTIONS (O)]   [OK]   [CLOSE]

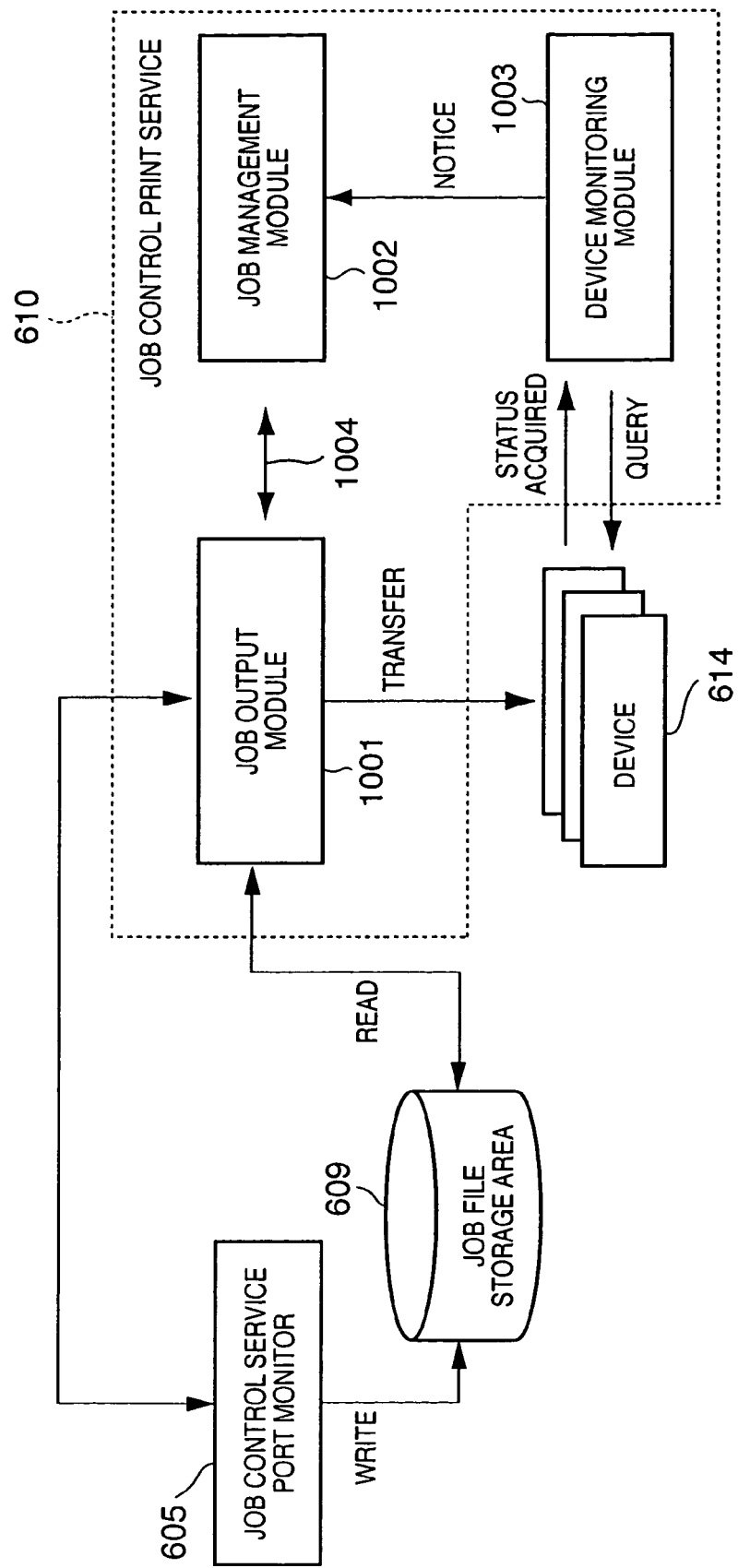

FIG. 11

JOB LIST

PRINTER NAME : Printer E
CONNECTION : Proxy Output Port E (PRINTER DEVICE E)
STATUS : PRINT ENABLED

| NAME OF DOCUMENT | STATUS | OWNER | SIZE | TIME RECEIVED |
|---|---|---|---|---|
| printer Test Page | SPOOLING ERROR | kurotsu | 16.2 KB | XX:XX:XX |
| | | JOB INTERRUPTED (A) | | |
| | | JOB RE-OPENED (R) | | |
| | | JOB REPRINTING (P) | | |
| | | JOB CANCELLED (D) | | |
| | | JOB DETAILS (T) | | |

| JOB IDENTIFIER | SECOND JOB ID |
|---|---|
| ORIGINAL JOB IDENTIFIER | SECOND JOB ID |
| OS JOB IDENTIFIER | FIRST JOB ID |
| FILE NAME | FILE A |
| PRINTER NAME | PRINTER E |
| PORT NAME | Proxy Output Port E |
| STATUS | SPOOLING ERROR |
| TIME RECEIVED | X:X:X |
| PRIORITY | 1 |
| NAME OF DOC | Printer Test Page |
| SIZE | 16.2 KB |
| OWNER | kurotsu |

F I G. 16

| PRINTER OPTION |
|---|

JOB PRIORITY LEVEL (J) : [1] ◄► (1~99)

PROXY GENERATION CONDITIONS :

☑ TIME ERROR GENERATED (E)

☐ PORT UNUSABLE (P)

☐ NO. OF JOBS WAITING TO BE PRINTED (N) [0] JOBS

☐ SIZE OF JOBS WAITING TO BE PRINTED (S) [0] KB

[ OK ]   [ CANCEL ]   [ HELP (H) ]

PRINT CONTROL PROGRAM AND INFORMATION PROCESSING APPARATUS

FIELD OF THE INVENTION

The present invention relates to a print control program and information processing apparatus, and more particularly, to a print control program and information processing apparatus that transfer on print data to an image-forming device.

BACKGROUND OF THE INVENTION

Conventionally, a transfer technology is known that sequentially transfers data written as a spool file via an operating system (hereinafter referred to as OS), such as Windows (registered trademark), to an apparatus, such as a printer, without waiting for the spool to finish.

Additionally, a technology is known that creates an original spool file separate from the spool file for printing created by the Windows (registered trademark) OS and uses the original spool file when reprinting is required.

For example, Japanese Laid-Open Patent Publication No. 2002-196916 discloses a re-transfer technology that stores print data transferred to a printer after the transfer is finished, transferring the stored print data once more to the printer.

However, one problem with the conventional technology is that transfer to the apparatus begins before spooling to the OS spooler from the application is finished. For example, if the process of generating print data in the application or printer driver does not go smoothly, spooling to the spooler provided by the OS is interrupted, the waiting time increases and printing is stopped due to an interface time out.

The conventional system, when some sort of error occurs, re-transfers the job. However, in order to carry out that re-transfer, it is necessary to be able to re-read the print data and the spool must be finished. In other words, if an error occurs while the print data is being spooled, it is necessary to wait until spooling is finished in order to re-transfer the print data. As a result, a lengthy period of time is required in order re-transfer spool files to other apparatus.

SUMMARY OF THE INVENTION

Accordingly, the present invention is conceived as a response to the above-described disadvantages of the conventional art.

According to one aspect of the present invention, preferably, a print control program executed by an information processing apparatus that transmits print data to an image-forming device and records an image comprises:

code for causing the information processing apparatus to execute a spooling step of further re-spooling, as a second spool file, print data spooled by an operating system as a first spool file; and code for causing the information processing apparatus to execute a transmission step of reading out and transmitting to the image-forming device a portion of the print data re-spooled as the second spool file during re-spooling in the spooling step.

According to another aspect of the present invention, preferably, a print control program executed by an information processing apparatus that transmits print data to an image-forming device and records an image comprises:

code for causing the information processing apparatus to execute a spooling step of further re-spooling print data spooled by an operating system; and code for causing the information processing apparatus to execute a transmission step of reading out and transmitting to the image-forming device a portion of the print data re-spooled, when an amount of the print data, which is re-spooled and not yet transmitted to the image-forming device, is below a predetermined threshold, during re-spooling in the spooling step.

In order to achieve the above-described object, a recording medium is provided on which the above-described print control program according to the present invention is stored.

According to another aspect of the present invention, preferably, an information processing apparatus for transmitting print data to an image-forming device and recording an image comprises:

a spooling unit for further re-spooling, as a second spool file, print data spooled by an operating system as a first spool file and then once de-spooled; and a transmission unit for reading out and transmitting to the image-forming device a portion of the print data re-spooled as the second spool file during re-spooling by the spooling unit.

Other features and advantages of the present invention will be apparent from the following description when taken in conjunction with the accompanying drawings, in which like reference characters designate the same or similar parts throughout the figures thereof.

BRIEF DESCRIPTION OF THE DRAWINGS

FIG. 9 is a diagram showing a sample print setting screen according to one embodiment of the present invention;

FIG. 10 is a detailed diagram of the print control function of an information processing apparatus according to one embodiment of the present invention;

FIG. 11 is a diagram showing a sample print setting screen according to one embodiment of the present invention;

FIG. 13 is a diagram showing sample job information according to one embodiment of the present invention;

FIG. 16 is a diagram showing a sample print setting screen according to one embodiment of the present invention.

DETAILED DESCRIPTION OF THE PREFERRED EMBODIMENTS

A preferred embodiment of the present invention is now described in detail, with reference to the accompanying drawings. It should be noted that the relative arrangement of the components, the numerical expressions and numerical values set forth in this embodiment do not limit the scope of the present invention unless it is specifically stated otherwise.

(System Configuration)

Figure 1:
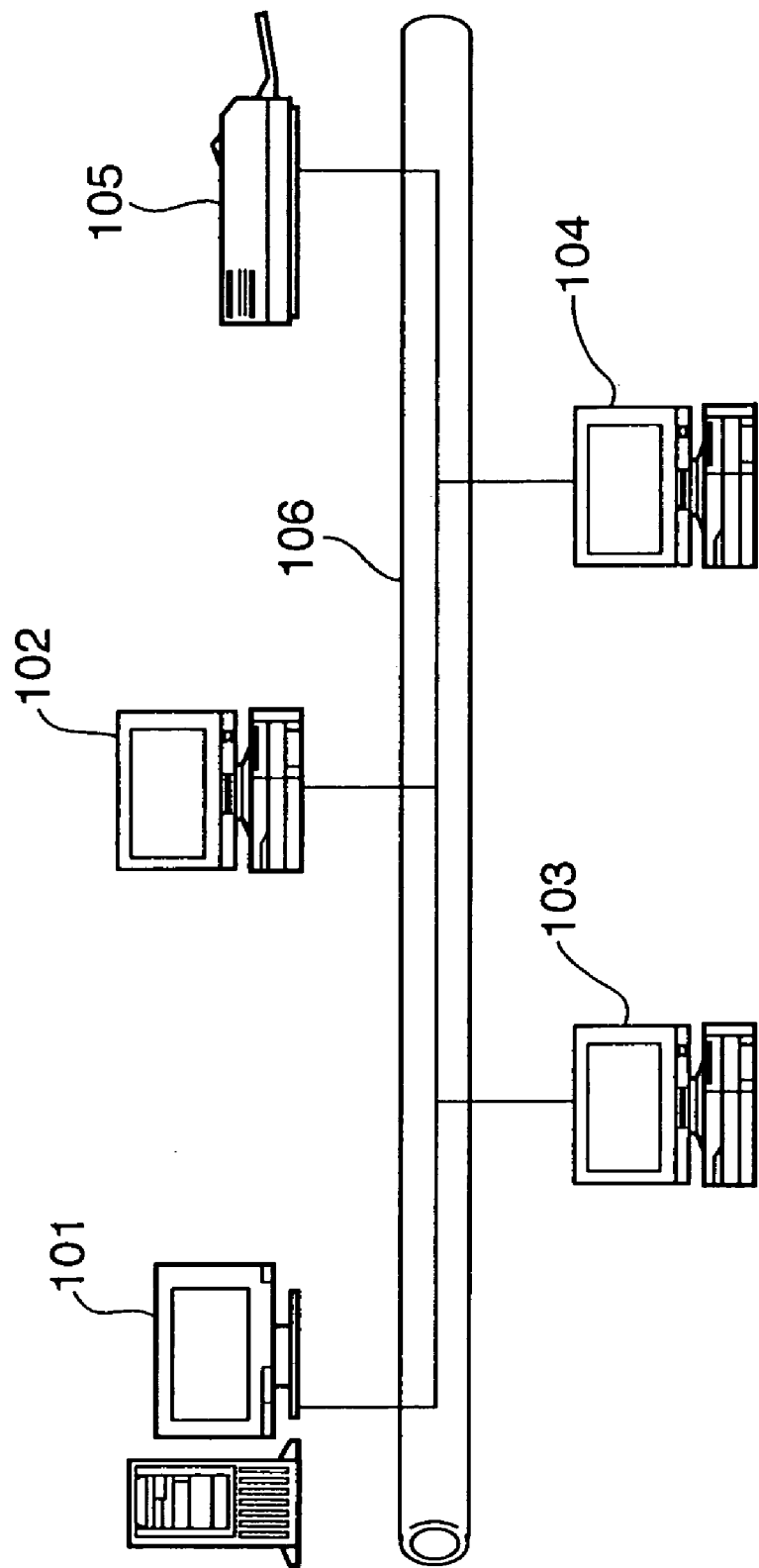
FIG. 1 is a diagram showing the configuration of a print processing system according to one embodiment of the present invention.

FIG. 1 is a diagram showing the configuration of a print processing system according to one embodiment of the present invention.

In FIG. 1, reference numerals 102-104 denote client computers (hereinafter also called "Client" or "Clients") as information processing apparatuses, connected to a network 106 by a network cable such as Ethernet (registered trademark). The Clients 102-104 are capable of executing a variety of programs including application programs, and are equipped with printer drivers having the capability to convert print data into printer language. Here, the Clients 102-104 are able to register multiple printer drivers. It should be noted that although FIG. 1 shows three Clients, such number is illustrative only, and hence the number of Clients connected to the network 106 may also be 1, or 4 or more, as required.

Reference numeral 101 denotes a printer server (indicated in the diagram as a "server") as an information processing apparatus, and is connected to the network 106 by a network cable. The printer server 101 accumulates files used on the network 106 and monitors the usage status of the network 106. The printer server 101 also manages multiple printers connected to the network 106.

It should be noted that the Clients 102-104 and the printer server 101 can be configured so as to be contained in an ordinary information processing apparatus (a so-called personal computer or the like), in such a way as to be able to execute a print control program that performs respective different controls. Additionally, the printer server 101 can be made to function simultaneously as a Client as well.

Here, the print control program includes a program that instructs the Clients 102-104 to change the destination of a print job or change the order (that is, the sequence) of printing. Additionally, the print control program includes a program that indicates a print job is completed or that there is a request to change the destination of a print job. Here, the print control program includes one module installed in the Clients 102-104 and a separate module installed in the printer server 101. However, the print control program of the present invention is not limited to such an arrangement, and may instead be configured so as to function for the Client, through an environment in which a single print control program is executed, or function as the server. Alternatively, a module equipped to function for Client use and another module equipped to function as a printer server may both be installed in a single computer, so that the two modules operate in quasi-parallel fashion, either simultaneously or alternately.

The printer server 101 is equipped with the capability to receive print jobs including drawing data from the Clients 102-104 and cause the printer to print. Moreover, the printer server 101 is equipped with the capability to accept print data that does not include drawing data from the Clients 102-104, manage the printing order of the Clients 102-104, and notify each of the Clients in order that transmission of print jobs including drawing data is enabled. Further, the printer server 101 is equipped with the capability to obtain the status of the network 106 and a variety of information pertaining to the print jobs and passing that information along to the Clients 102-104.

A network printer 105 is connected as an image-forming device to the network 106 through a network interface. The network printer 105 analyzes print jobs including drawing data transmitted from the Clients 102-104, converts the print jobs into dot images one page at a time, and prints out the print jobs a page at a time.

Figure 2:
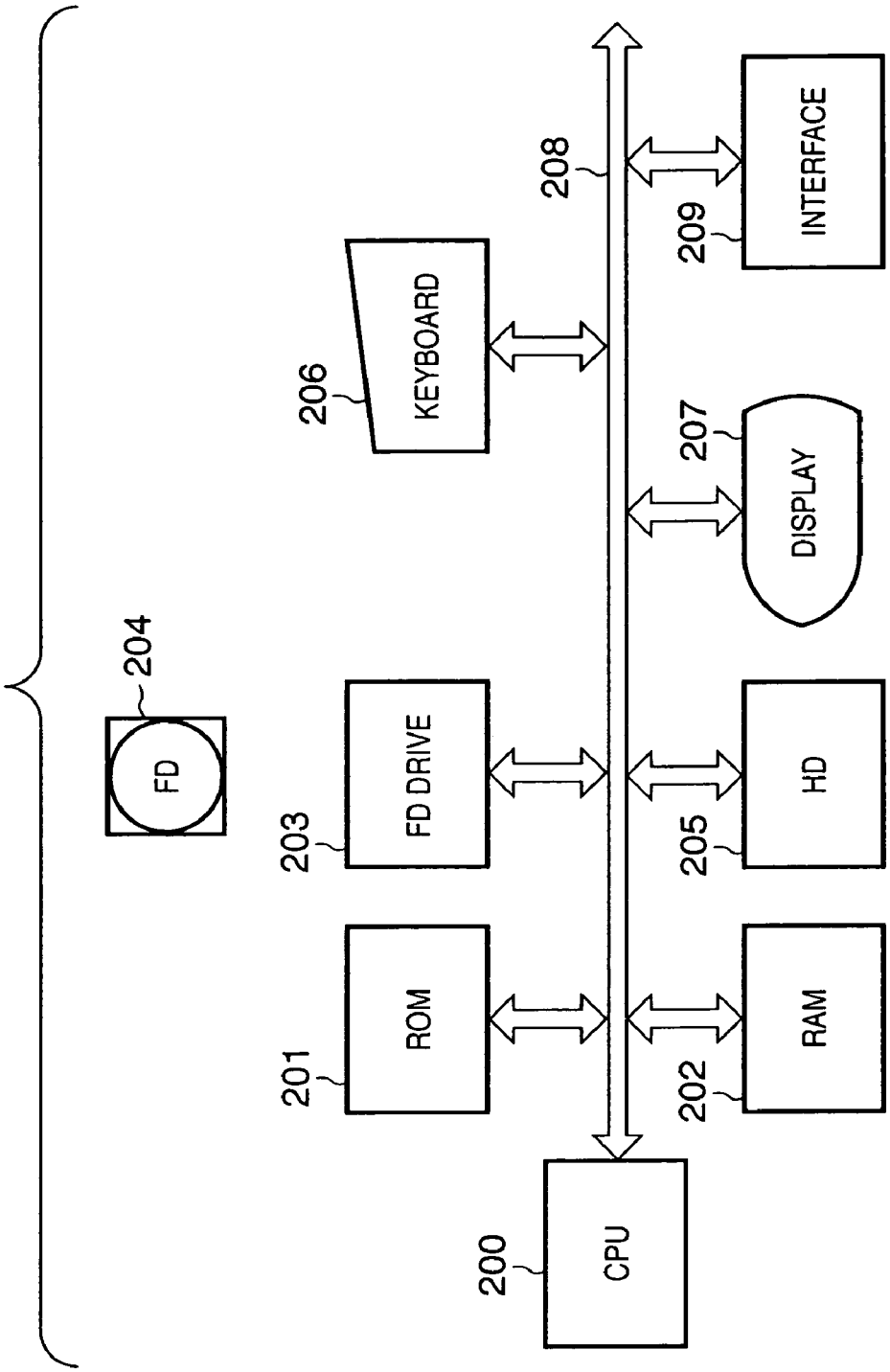
FIG. 2 is a block diagram showing the configuration of an information processing apparatus in a print processing system according to one embodiment of the present invention.

A variety of different types of image-forming devices may be adapted for use as the network printer 105 described above, including an electrophotographic laser-beam printer, copier or digital copier or facsimile machine, or an ink jet printer or digital copier or the like. FIG. 2 is block diagram showing the structure of an information processing apparatus that can be used as the printer server 101 or the Clients 102-104.

In FIG. 2, a CPU 200 that is a control means of an information processing apparatus executes application programs, printer driver programs, OS and print control programs stored on a hard disk 205, and temporarily stores information, files, etc. needed to execute the programs in the RAM 202.

A ROM 201 stores within it programs, such as a basic I/O program, as well as a variety of data, including font data for use when word processing, template data and so forth. The RAM 202, which is a temporary storage means, functions as the main memory and work area of the CPU 200 described above.

FD drive 203 can load programs stored on FD recording medium into the computer system. It should be noted that the FD 204 recording medium is a recording medium on which computer-readable programs are stored. As storage media, the present invention is not limited to FD. Instead, a variety of different media may be used, including CD-ROM, CD-R, CD-RW, PC cards, DID, IC memory cards, MO, memory sticks, etc. When using storage media other than FD, a drive adapted to the medium may be used either instead of the FD drive 203 or in combination with the FD drive 203.

The above-described application programs, printer driver programs, OS, print control program and other related programs are stored on the hard disk (hereinafter referred to as HD) 205, which is an external storage device and which functions as a large-capacity memory. Additionally, a spooler, which is a spool means, is also stored in the HD 205. In this specification, the term "spooler" means the Client spoolers at the Clients 102-104 and means the server spooler at the printer server 101. Moreover, job information from the Clients 102-104 is stored at the printer server 101 and a table for sequence control is also generated and stored at the HD 205.

A keyboard 206 is provided to enable a user to input control commands to the computer, or to enable an operator or manager to input control commands to the printer server. It should be noted that a pointing device (not shown in the diagram) may be further provided in order to enable input of instructions.

A display 207 displays commands input from the keyboard 206, the printer status and so forth. A system bus 208 controls the flow of data inside the information processing apparatus. The information processing apparatus is connected to the network 106 through an interface 209, thereby enabling the apparatus to exchange data with an external device.

Figure 3:
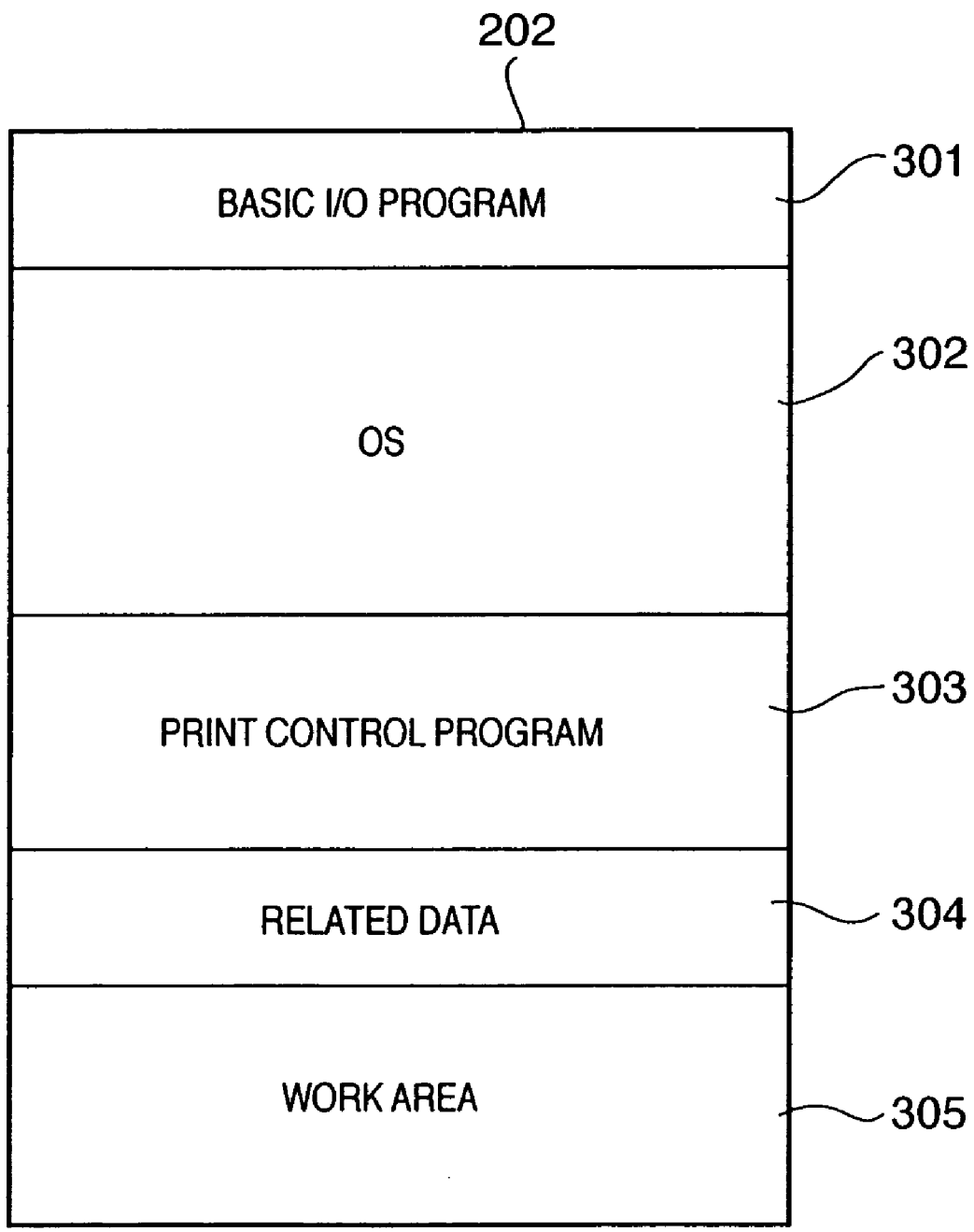
FIG. 3 is a diagram showing a sample RAM memory map of an information processing apparatus according to one embodiment of the present invention.
Figure 4:
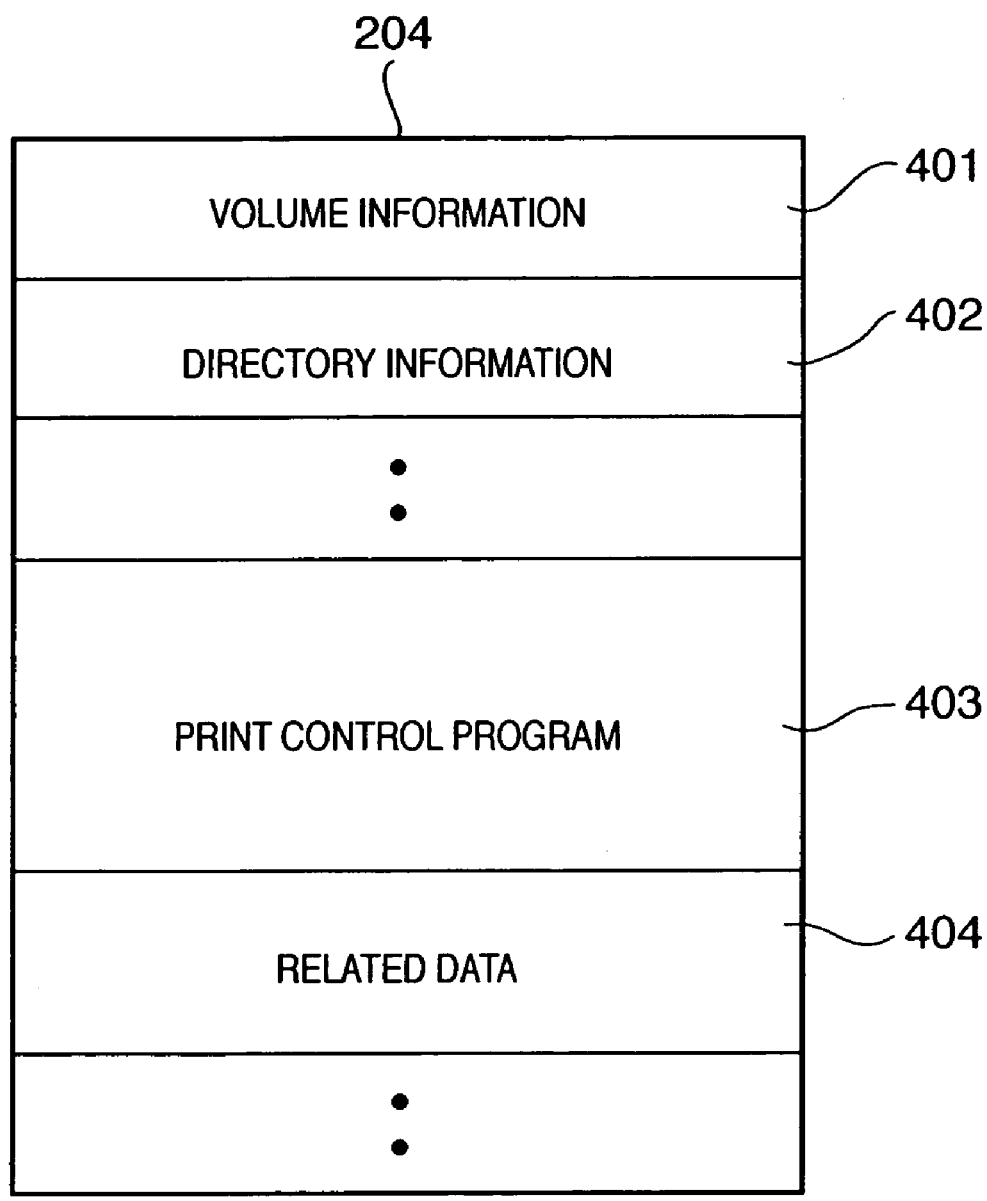
FIG. 4 is a diagram showing a floppy disk (hereinafter referred to as FD) memory map of an information processing apparatus according to one embodiment of the present invention.

A description is now given of the data structures used in the present embodiment, with reference to FIGS. 3 and 4.

FIG. 3 is a diagram showing an example of a memory map of the RAM 202 shown in FIG. 2. FIG. 4 shows an example of the memory map of the FD 204 shown in FIG. 2.

In FIG. 3, reference numeral 301 denotes the basic I/O program, an area in which resides a program that has an Initial Program Loading (hereinafter referred to as "IPL") function that reads the OS from the HD 205 to the RAM 202 and starts the OS running when the control apparatus is turned ON. Reference numeral 302 denotes an operating system (OS) and reference numeral 303 denotes a print control program. Both programs are stored in separate areas on the RAM 202. Reference numeral 304 denotes related data, which is recorded in a designated area on the RAM 202. Reference numeral 305 denotes a work area, which is sued by the CPU 200 when the CPU 200 executes the print control program 303 of the present embodiment.

In FIG. 4, reference numeral 401 denotes volume information showing data information, reference numeral 402 denotes directory information, reference numeral 403 denotes a print control program 403 and reference numeral 404 denotes related data. The print control program 403, in the present embodiment, has the same structure for both the client and the server.

Figure 5:
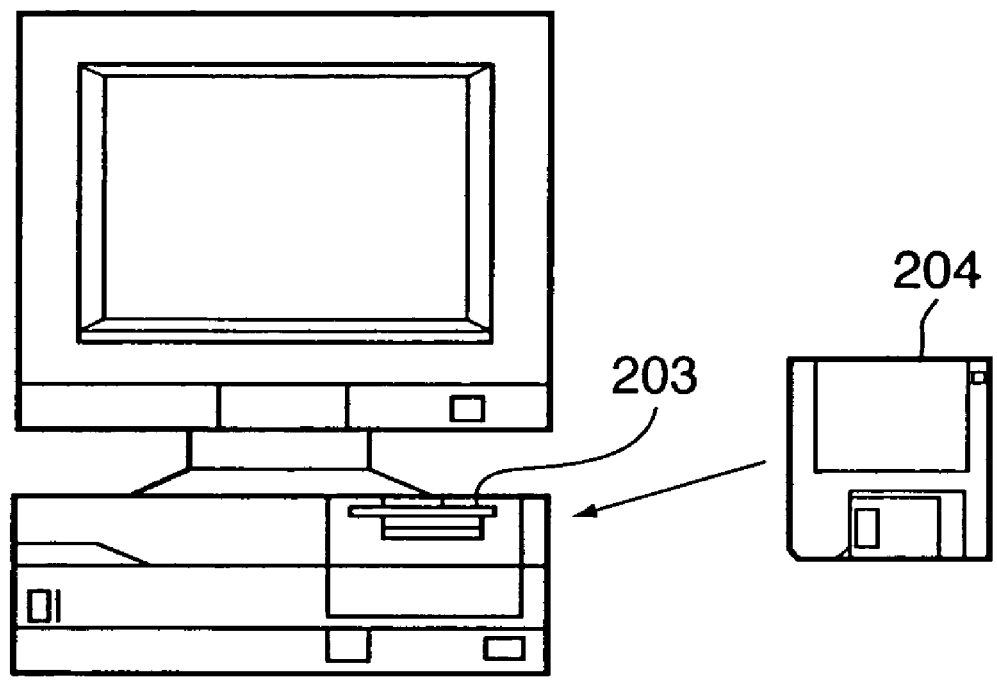
FIG. 5 is a diagram showing an information processing apparatus and a FD to be inserted into an FD drive of the information processing apparatus according to one embodiment of the present invention.

FIG. 5 is a diagram showing the relation of the apparatus to the FD 204 that is inserted into the FD drive 203 shown in FIG. 2. For example, when a print control program is stored on the FD 204 as shown in FIG. 5 the print control program on the FD 204 is read by the FD drive 203 and loaded into the RAM 20 as shown in FIG. 3, where it is ready to be executed.

It should be noted that, in addition to the print control program and the related data from the FD 204 being loaded directly into the RAM 202 and executed, instead the print control program may be installed on the HD 205 ahead of time and loaded from the HD 205 into the RAM 202 as necessary. Additionally, instead of a FD, the medium used to store the print control program of the present embodiment may be a CD-ROM, CD-R, PC card, DVD or IC memory card. Further, the present print control program may be stored on the ROM 201 and configured so as to comprise a portion of the memory map thereof, and so may be executed directly by the CPU 200. Finally, software that can implement the same functions as the apparatuses described above may be used in place of the hardware.

(Print Control Process)

Figure 6:
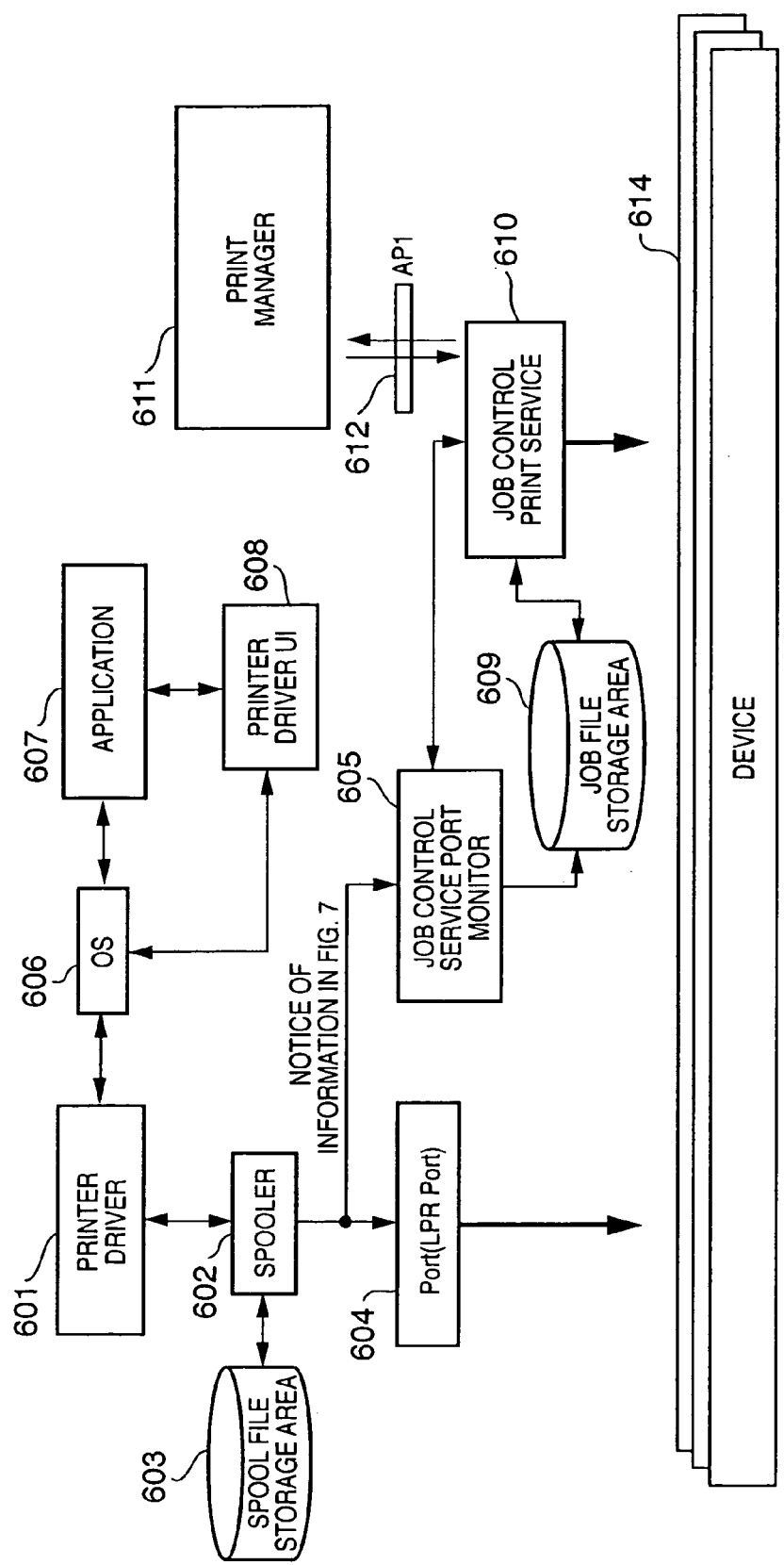
FIG. 6 is a schematic functional diagram of a print control function of an information processing apparatus according to one embodiment of the present invention.

FIG. 6 is a schematic functional diagram of a print control function of an information processing apparatus according to one embodiment of the present invention.

In addition to the conventional print control modules, that is, a printer driver 601, a spooler 602 and an LPR port 604, the present print system also includes a job control service port monitor 605, a job control print service 610 and a print manager 611. The functions of the job control service port monitor 605, job control print service 610 and print manager 611 are implemented by executing the above-described print control program.

To put it another way, the functions of the job control service port monitor 605, job control print service 610 and print manager 611 are included in the print control program according to the present embodiment.

Next, a description is given of the print process performed by the present print system.

The printer driver 601 displays a user interface 608 on the display 607 of the Clients 102-104 via the OS 606 (and application 607), accepts print settings from the user, and accepts instructions to print from the application according to the print settings once these print settings have been confirmed through the user interface 608.

Figure 8:
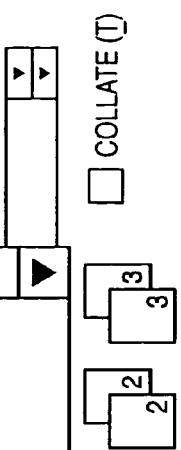
FIG. 8 is a diagram showing a sample print setting screen according to one embodiment of the present invention.

FIG. 8 is a diagram showing a sample print setting screen according to one embodiment of the present invention. More specifically, FIG. 8 shows an example of a user interface (print setting screen) displayed on the display 207 of the Clients 102-104. Reference numeral 801 denotes a printer list that the Clients 102-104 can select. In the state depicted in FIG. 8, "Printer E" is selected from the printer list 801.

It should be noted that the printer list shown here is not a list of the names of the printer devices themselves but of the various processing methods indicating how a particular print job is to be processed. Accordingly, in the printer list 801, "printer C", for example, might show a PDF (Portable Document Format) (registered trademark) writer. Or, "Automatic Proxy" and "Same as Above" might indicate a hypothetical printer for the purpose of designating printing by certain specific multiple printers (so-called "member printers"). "Printer B" and "Printer D", for example, may be registered ahead of time as member printers designated by "Automatic Proxy" and "Same as Above".

FIG. 9 is a diagram showing a sample print setting screen according to one embodiment of the present invention, specifically a user interface in a state in which selection of "Printer E" in FIG. 8 is confirmed. Reference numeral 901 denotes a space for showing the name of the port corresponding to the selected printer, and here shows that the name of the port for "Printer E" is "Proxy Output Port E" (hereinafter called "Port E"). It should be noted that a table correlating the printers shown in the printer list 801 in FIG. 8 and the port names is stored on the HD 205. When one of the printers is selected from among the plurality of printers, the display shown in the space 901 in FIG. 9 is that of the corresponding port.

When an instruction to print from the user is input from the keyboard 206 or a pointing device not shown in the diagram vis-à-vis the screen shown in FIG. 9, (that is, the user presses the "OK" button), the OS 606 shown in FIG. 6 interprets the instruction and sends it as a drawing instruction which is described by a Device Driver Interface (hereinafter referred to as DDI) function to the printer driver 601 shown in FIG. 6. The printer driver 601 then generates print data written in Page Description Language (hereinafter referred to as PDL) based on the drawing instruction described by the DDI function supplied via the OS. The print data includes both drawing data drawn by the application program and job control data.

The generated print data is stored in a spool file storage area 603 by the OS spooler 602 as a spool file (first spool file). If the port allocated to the printer selected using the screen in FIG. 9 is the LPR port 604, then the print data transferred from the spooler 602 using Line Printer Demon Protocol (hereinafter referred to as LPR) is sent to a device 614 that acts as an image-forming device. The print data transferred from the LPR port 604 is erased after transfer and is not available for reprinting/proxy printing.

Here, the device 614 corresponds to the network printer 105 in FIG. 1, and as described above any of a variety of types of image-forming devices may be adapted thereto, including, but not limited to, an electrophotographic laser-beam printer, copier or digital copier or facsimile machine, or an ink jet printer or digital copier.

By contrast, if the port allocated to the printer is the job control service port monitor 605, then as a de-spool process, job transfer start notification and drawing data are sent from the spooler 602 to the job control service port monitor 605.

Then, the drawing data sent to the job control service port monitor 605 is re-spooled to a job file storage area 609 as a job file (second spool file).

It should be noted that the job control service port monitor 605 is provided for every port, and maintains settings such as the data format used when storing the job files to the respective job file storage areas 609. Accordingly, the spooler 602 determines which port a particular job corresponds to and de-spools to the job control service port monitor 605 for that job.

Figure 7:
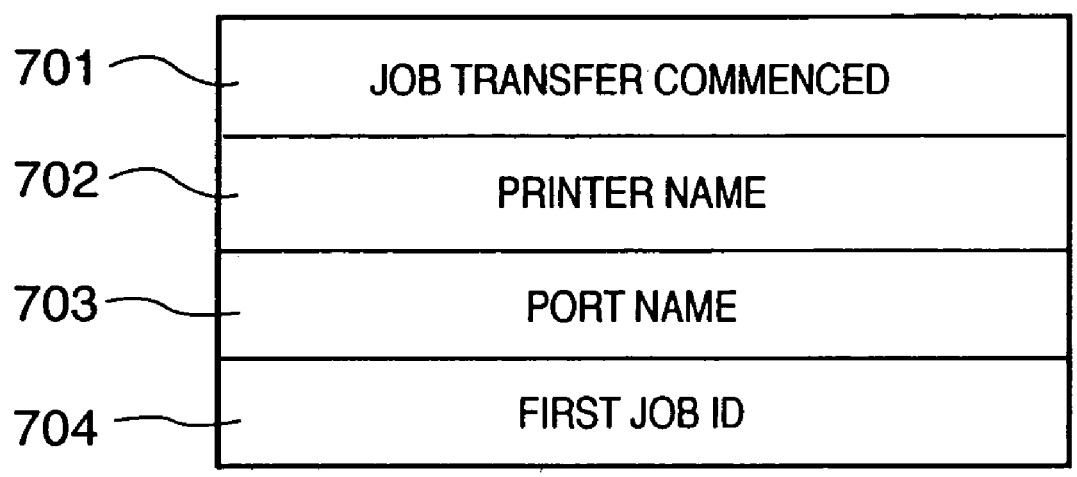
FIG. 7 is a diagram showing sample notice information according to one embodiment of the present invention.

FIG. 7 is a diagram showing sample notice information according to one embodiment of the present invention, that is, a job transfer start notice sent to the job control service port monitor 605 from the spooler 602.

In FIG. 7, reference numeral 701 denotes the start of a job transfer and reference numeral 702 denotes the printer name. The printer name 702 corresponds to the name by which printers selected from the printer list in the user interfaces shown in FIGS. 8 and 9 is identified.

Reference numeral 703 denotes the port name corresponding to the printer selected from the printer list 801, and is the same as the port names denoted by reference numeral 901 in FIG. 9.

Reference numeral 704 denotes a job identifier ID issued through the OS in accordance with an instruction to print (hereinafter referred to as "First Job ID"). It is not necessary that the First Job ID 704 is itself an ID for the purpose of identifying an instruction to print issued via the OS, so long as it is correlated with that ID.

The job control service port monitor 605 provides the job control print service 610 with the received information in FIG. 7 as a job start notice. The job start notice must include at least the First Job ID 704. Other information relating to the First Job ID 704 may be specified through the job control print service 610 using the First Job ID 704 as a key.

In response, the job control print service 610 generates a job identifier as an ID (hereinafter referred to as "Second Job ID") for identifying the print request 610 inside the job control service, and transmits that Second Job ID to the job control service port monitor 605. Additionally, the job control print service 610 generates a file name for storing the drawing data in the job file storage area 609 at the same time that it generates the Second Job ID, and transmits that file name to the job control service port monitor 605.

That a Second Job ID is generated separately from the First Job ID occurs for the following reason:

In principle, the First Job ID managed in the OS is released at the moment printing ends, and hence there is a possibility that a new job could be assigned the exact same First Job ID. At the same time, the print control program, which includes the job control print service 610, saves the job information and drawing data of finished jobs and tries to use that information and data effectively during reprinting. Accordingly, if print jobs are managed using only a First Job ID, there is no way to distinguish between two jobs that are given the same First Job ID. Here, the job control print service 610 gives an original Second Job ID to every job it manages, so that the foregoing problem does not occur.

The job control service port monitor 605 sequentially assigns the file names as instructed from the job control print service 610 to the drawing data sent from the spooler 602 and writes the drawing data files thus named to the job file storage area 609, and then notifies the job control print service 610 that drawing data is beginning to be written.

When the job control print service 610 receives notification that data files are beginning to be written to the job file storage area 609, the job control print service 610 sequentially reads the drawing data written to the job file storage area 609 and transmits the data to the corresponding device among the plurality of devices 614.

At the same time, the print manager 611 is one type of application, and exchanges a variety of information with the job control print service 610 through an Application Program Interface (hereinafter referred to as API) 612. This exchange of information involves an assignment of job identifiers shown in FIG. 13 (to be described later). For example, the print manager 611 creates user interfaces that reflect the status of the device 614 or the status of the job monitored by the job control print service 610 and provides a variety of print instruction input screens.

FIG. 11 is a diagram showing a sample print setting screen according to one embodiment of the present invention, or more specifically, an example of a job list screen that the print manager 611 can display. Although in the display in FIG. 11 only one job is shown, sometimes multiple jobs are displayed, in which case each job is assigned its own job identifier.

The print manager 611 obtains a list of print jobs from the job control print service 610 and can display a job list screen like that in FIG. 11 on the display 207. The job list screen shows the name of the printer for that job (Printer E), the connection port (Proxy Output Port E), and a status 1101 that includes the status of the device. In the diagram, a job called "Printer Test Page" has been selected.

Additionally, that status of each job is given in a list 1102. By selecting a job from the list 1102 and displaying it on a pop-up menu 1103, that job can be cancelled, stopped, restarted or reprinted. The instructions that are input from the pop-up menu 1103 are then sent to the job control print service 610 together with the Second Job ID of the selected job.

That is, every job displayed on the job list screen is assigned a Second Job ID, so when a job is selected from the list and an instruction for it input, the Second Job ID for that job is sent from the print manager 11 to the job control print service 610. The job control print service 610 then identifies the job by the Second Job ID received, and reprints, deletes or otherwise processes the job.

The print manager 11 basically displays the job list screen in response to an instruction from the user. However, matters may also be arranged so that the print manager 11 automatically displays the job list screen in response to the sending of error occurrence information, such as a backlog of transmissions to the image-forming device acknowledged by the job control print service 610.

FIG. 10 is a block diagram showing details of the job control print service 610 in FIG. 6.

A job output module 1001 lists job information and transmits print data to the device 614.

A device monitoring module 1003 is provided with the capability to monitor the status information of the device through a communications line such as a network cable. The device monitoring module 1003 is provided with the capability to query the device and to receive status information notices sent ad hoc from the device.

The status information includes, but is not limited to, device 614 error information such as empty paper/toner supply, jams, door open, etc., and device 614 processing load information such as the number of jobs in the queue.

A job management module 1002 is provided with the capability to mediate the exchange of information between the device monitoring module 1003 and the job output module 1001. Additionally, when the job control print service 610 operates as a server program on the server 101 and/or multiple jobs (i.e., job information and job files) to be output to the same device are present in the job output module 1001, the job management module 1002 is provided with the capability to control the order of transmission of those jobs. The double-headed arrow denoted by reference numeral 1004 in FIG. 10 indicates both a scheduling request (i.e., an output order control request) and a scheduling instruction (i.e., an output commence instruction).

Figure 12:
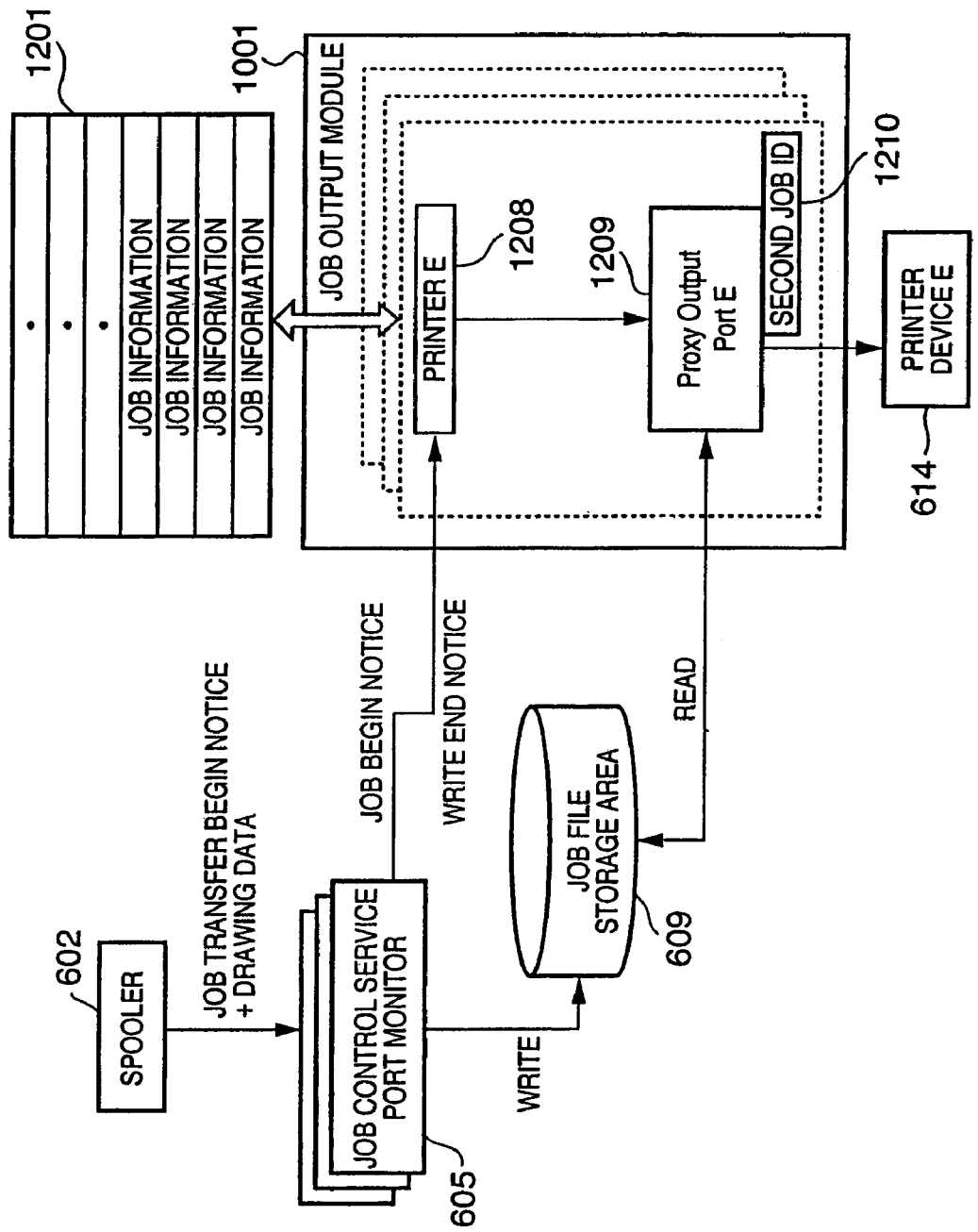
FIG. 12 is a detailed diagram of the print control function of an information processing apparatus according to one embodiment of the present invention.

FIG. 12 is a detailed diagram of the print control function of an information processing apparatus according to one embodiment of the present invention. More specifically, FIG. 12 is a block diagram showing an even more detailed view of the functional configuration of the job output module 1001. As shown in FIG. 12, the job output module 1001 manages a job information list 1201 by port and by printer registered in the OS spooler, so the job output module 1001 includes objects 1208, 1209 corresponding to the printers and the ports. In FIG. 12, Printer E and Port E are shown as examples of these objects, and Printer Device E is shown as the device corresponding to Port E.

Additionally, as described above a job control service port monitor 605 is provided for each port. As a result, job information de-spooled from the spooler 602 is allocated to the job control service port monitors according to the port specified thereat. The job control service port monitors then process between the corresponding printer object and port object.

The printer objects 1208 have the capability to search the job information list 1201 for job information and to transmit job files to the port object 1209. Additionally, the printer objects store decompression information necessary for control inside the job control print service 610, and further, are equipped with the capability to display a user interface for carrying out those settings.

Thus, FIG. 16 is a diagram showing a sample print setting screen according to one embodiment of the present invention, more specifically, an example of a screen for setting that decompression information. As shown in FIG. 16, job priority and proxy launch conditions constitute the type of decompression information that can be set for the printer object 1208.

The port objects 1209 have the capability to wait for the Second Job ID of the job instructed to be transmitted from the printer object 1208 and to register the job in the job queue 1210. The port objects 1209 further have the capability at the queue 1210 to read the job file corresponding to the first registered Second Job ID from the job file storage area 609 and transmit that job file to a particular device.

Figure 17:
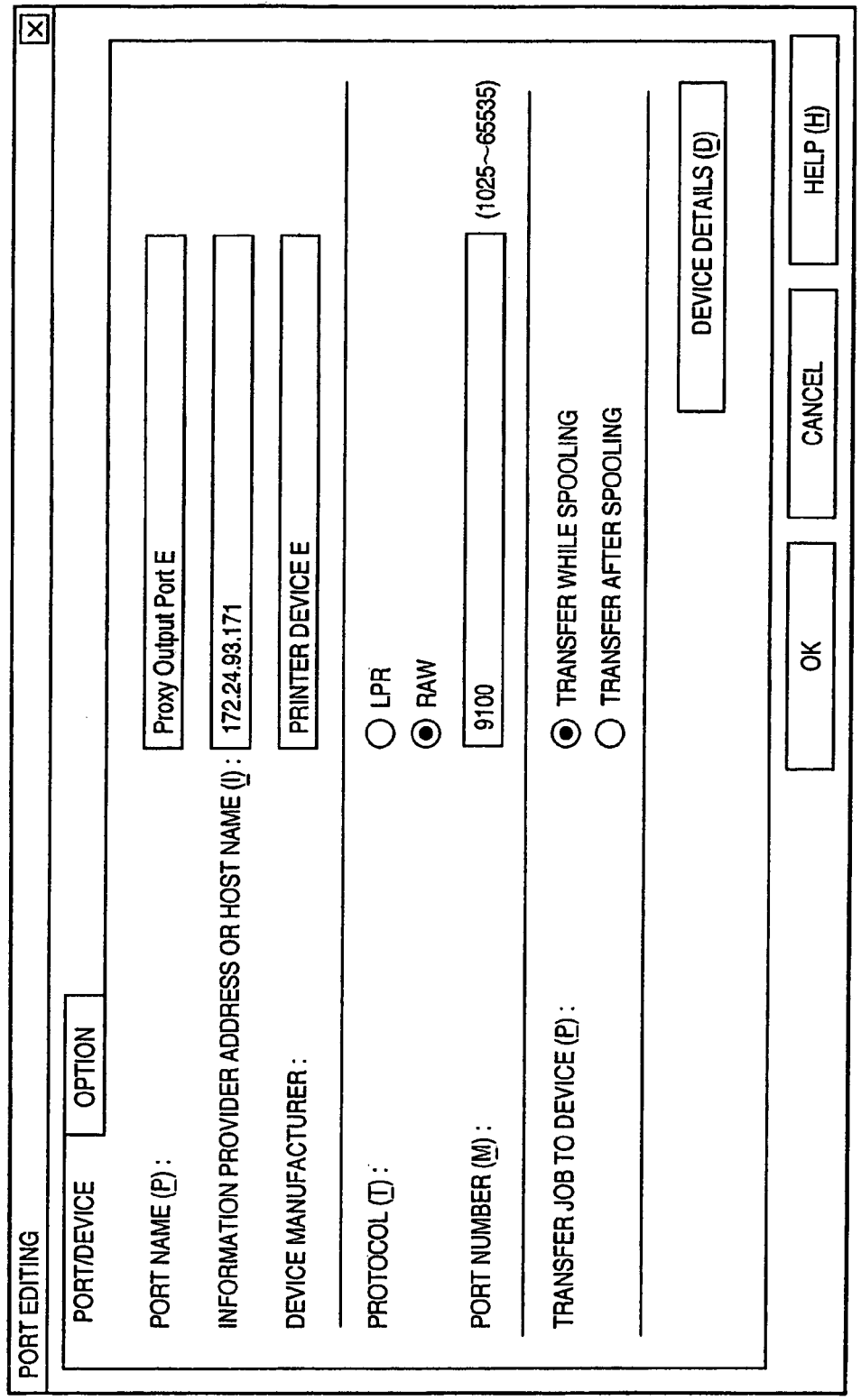
FIG. 17 is a diagram showing a sample print setting screen according to one embodiment of the present invention.

The job control service port monitor 605 can display the user interface shown in FIG. 17, which is a diagram showing a sample print setting screen according to one embodiment of the present invention. In addition to displaying the device address, model name and so forth, the job control service port monitor 605 can accept such settings as transmission protocols, port numbers, and methods of transmitting to the device. A copy of the settings is also sent to the port object 1209.

Therefore, in the "Transfer job to device" checkbox in FIG. 17, when the "Transfer while spooling" option is selected, transmission to the device by the port object is carried out in parallel with (i.e., simultaneously with) the spooling to the job file storage area 609 by the job control service port monitor 605. When the "TRANSFER AFTER SPOOLING" option is selected, transfer to the device is begun after the job control service port monitor 605 spools all the drawing data corresponding to the job to the job file storage area 609 as is conventionally the case. In other words, the print control program 303 of the present invention enables the user to select whether or not to conduct spooling and port object transmission in parallel.

If the "TRANSFER WHILE SPOOLING" in FIG. 17 option is selected, then print data spooled by the OS as a spool file and then de-spooled is further re-spooled as a job file, and moreover, a portion of the print data being re-spooled as a spool file is read out and transmitted to the device during that re-spooling.

It should be noted that, when multiple port objects 1209 destined for output to a single device are present, the job information accepted by the printer object 1208 is arranged in order among the multiple port objects 1209 and sequentially transferred to the device.

It should be noted that the job information contained in the job information list 1201 is shown in detail in FIG. 13. FIG. 13 is a diagram showing sample job information according to one embodiment of the present invention. In addition to the correspondence between the First Job ID and the Second Job ID, the name of the job file, the printer name, the port name, the job status, and the date and time of reception are included in the job information. The job information list 1201 is structured so that it can be accessed from the printer object 1208 and port object 1209 via the API 612 and an internal interface (not shown in the diagram). It should be noted that the job information list 1201 is structured so that it can be stored in the RAM 202 and can be accessed at high speed. However, the copy thereof is stored on the HD 205 as a file, and, together with the job file, can be reused even if power to the apparatus is turned OFF.

Figure 14:
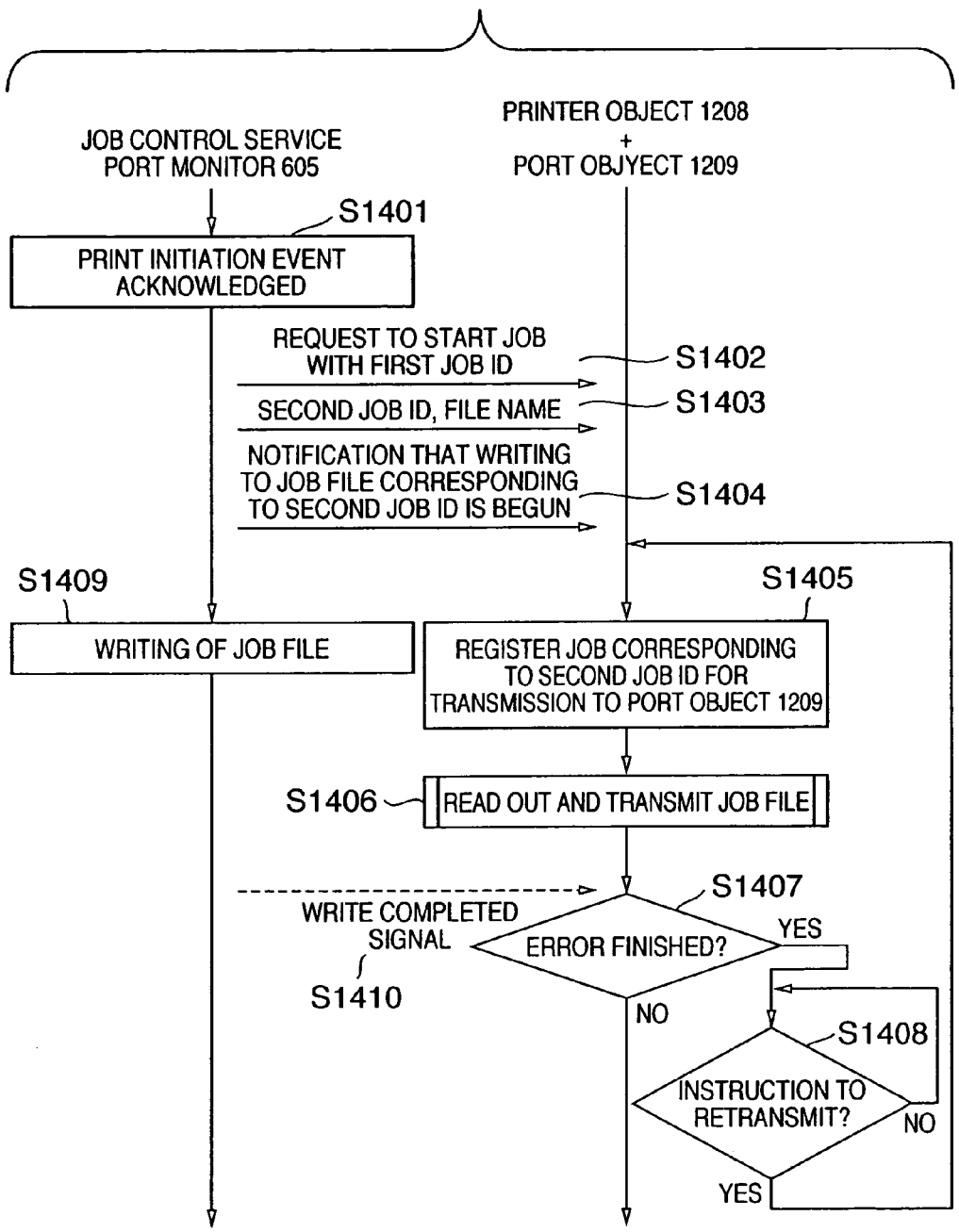
FIG. 14 is a flow chart showing steps in a print control program according to one embodiment of the present invention.

Next, a detailed description is given of the processing performed between the job control service port monitor 605, the printer object 1208 and the port object 1209, using FIG. 14.

FIG. 14 is a flow chart showing steps in a print control program according to one embodiment of the present invention.

When an instruction to print by Printer E is input via the user interface, the job control service port monitor 605 corresponding to Printer E (i.e., Port E) acknowledges a print initiation event from the OS (step S1401).

Next, the job control service port monitor 605 submits a request to begin a job including the information shown in FIG. 7 to the corresponding to printer object 1208 (step S1402).

The printer object 1208 acknowledges that a new job has been issued by the request to begin the job, and selects/generates from the job information list 1201 a not-yet-used Second Job ID and a file name to be used when storing the drawing data to the job file storage area 609. The printer object 1208 then registers the Second Job ID and file name on the job information list 1201 together with a First Job ID job and attributes obtained from the OS.

The job control service port monitor 605 identifies from the updated job information list 1201 the job information using the file name and First Job ID as keys, and accepts the Second Job ID and file name included in that job information as the answer in step S1402 (step S1403).

Next, the job control service port monitor 605 attaches the drawing data de-spooled from the spooler 602 to the file name received in step S1403 and writes the file to the job file storage area 609 (step S1409), and notifies the printer object 1208 that it has begun writing the Second Job ID and job file (step S1404).

If the "TRANSFER WHILE SPOOLING" option has been selected, the printer object 1208 picks up those jobs for which a transmission instruction has been received as candidates for transfer to the device without waiting for a signal that the writing of the job file is finished. Based on the order of priority and time received, which is included in the job information corresponding to the jobs in question, an order of transmission is then determined for those jobs marked as candidates for transfer.

When the time for transmission of a job registered in the queue 1210 and waiting to be transmitted arrives, the port object 1209 reads out the job file corresponding to that job from the job file storage area 609 and transmits the job file to the device (step S1406). The print device receiving the job file then executes printing to a recording medium based on the received job file.

If transmission of the job file to the device is terminated due to an error, however, then processing proceeds from step S1407 to step S1408 and awaits an instruction to retransmit. If the printer object 1208 is instructed to retransmit, then processing returns to step S1405 and the job corresponding to the Second Job ID is scheduled for retransmission to the port object 1209. Processing then proceeds to step S1406 and the job file is read and transmitted.

When the writing of the job file by the job control service port monitor 605 is finished, a synchronized signal indicating that the writing of the job file is finished is sent to the printer object 1208 (step S1410). The printer object 1208, when it receives a write completed signal, updates the job information list 1201 based on certain fixed attribute information (e.g., paper size, number of pages, etc.).

The write completed signal may be sent directly from the job control service port monitor 605 to the printer object 1208, and it may be sent using a semaphore (A semaphore is a mechanism or a signal exchanged between two processes performed in parallel and designed to synchronize the processes and/or to prevent them from interrupting each other).

If the printer object 1208 and the port object 1209 detect a write completed signal and there has been no error in the transmission of the job file to the device, then the printer object 1208 and the port object 1209 end the job transmission process.

(Data Transfer Process)

Figure 15:
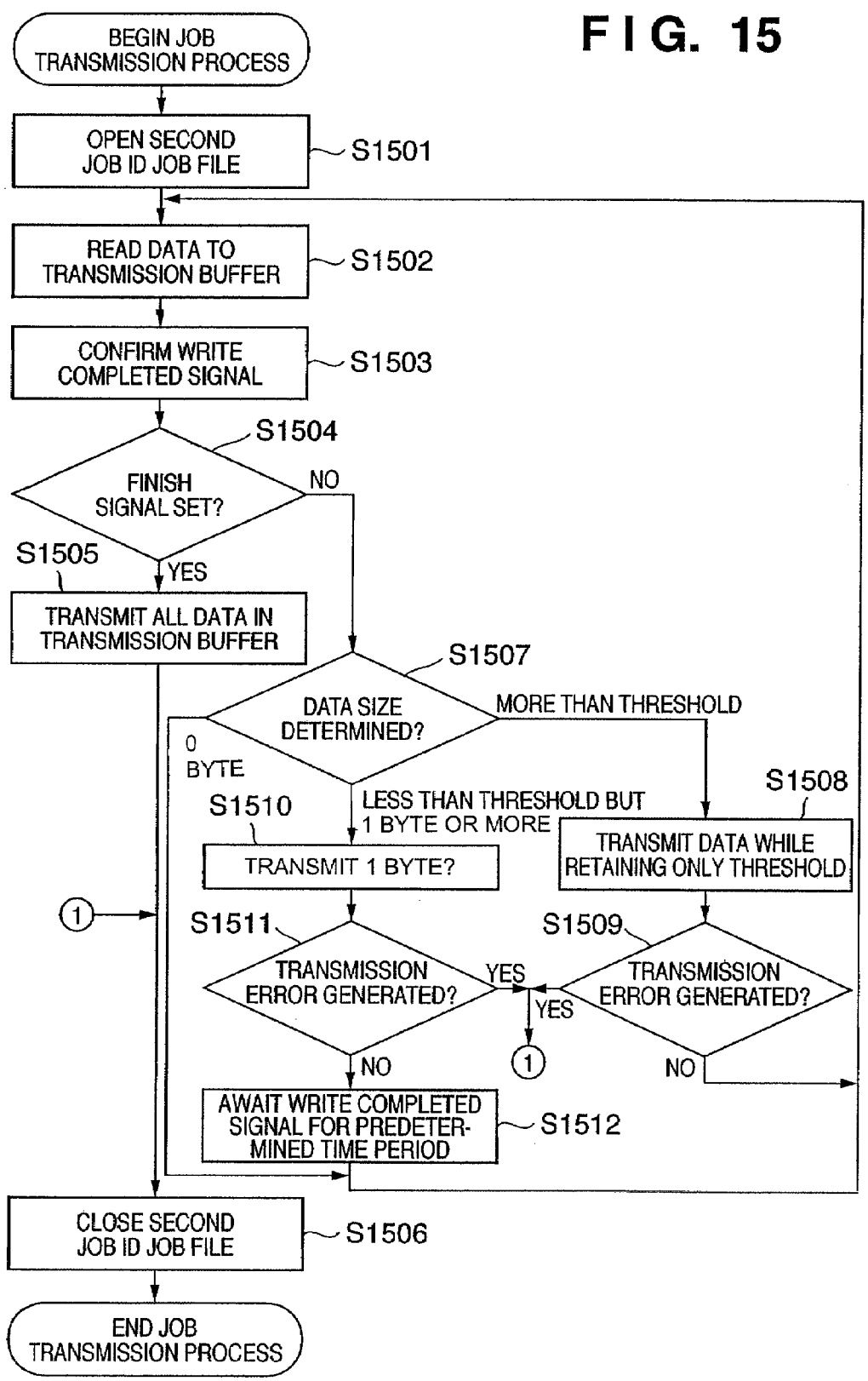
FIG. 15 is a flow chart showing steps in a print control program according to one embodiment of the present invention.

FIG. 15 is a flow chart showing steps in a print control program according to one embodiment of the present invention. More specifically, FIG. 15 is a flow chart showing in detail the job data transmission process of step S1406 in FIG. 14.

First, in a step S1501, the job file corresponding to the Second Job ID is opened in the job file storage area 609.

Then, in a step S1502, the job file data is stored in a RAM 202 transmission buffer. In a step S1503, it is confirmed whether or not a job file write completed signal has been set.

If in a step S1504 it is determined that a write completed signal has been set, then in a step S1505 all the data in the transmission buffer is transmitted, and in a step S1506 the file is closed and the transmission process ends.

If in step S1504 it is determined that the write completed signal has not been set and that data is still spooling, however, then processing proceeds to a step S1507 and the amount of data remaining in the transmission buffer is ascertained, if it is determined that the amount of data remaining in the transmission buffer is greater than a threshold, then in a step S1508 the data is transferred leaving only an amount of data equivalent to the threshold in the transmission buffer. For example, if the threshold is 1024 bytes, and the amount of data stored in the transmission buffer is 1124 bytes, then 1124−1024=100 bytes of data only are transmitted in step S1508.

During the transmission process of step S1508, if it is determined that the device does not accept the data and an error has occurred, then processing proceeds from step S1509 to step S1506, the file is closed and the transmission process terminates.

If it is determined in step S1509 that the transmission is successful, then processing returns to step S1502, the next data is read to the transmission buffer and transmission continues.

If in step S1507 it is determined that the amount of data remaining in the transmission buffer is less than the threshold but 1 byte or more, however, then in step S1510 only 1 byte of data is transmitted to the device 614.

In a step S1511 it is determines whether or not a transmission error has occurred, and if so, the process then proceeds to step S1506, the file is closed and the transmission process terminates.

If in step S1511 it is determined that the transmission is successful, however, then processing proceeds to a step S1512, where the process waits a predetermined time period for the write completed signal to be set. If in step S1512 either a time out is generated or a write completed signal is set, then processing ends.

Additionally, if in step S1507 it is determined that there is no data, then processing returns to the data read-out process of step S1502, or alternatively, in another embodiment, processing may proceed to step S1512.

According to the above-described process, print data in the job file is transmitted to the device in segments. As a result, the generation of an interface time out, in an arrangement like that in which a re-spooled job file is transmitted, can be avoided.

Additionally, when the system monitors job file spool completion and a spool file write completed is not detected, because the print data is transmitted to the device in segments, with all the data in the transmission buffer transferred when a write completed is detected, the present invention can handle cases in which there is a possibility that job file spooling via the job control service port monitor 605 might stall and can efficiently avoid an interface time out.

Additionally, when data that has not been transmitted to the device is detected in the job file, and a determination is made as to whether or not the amount of that untransmitted data is below a certain threshold, and the results of that determination indicate that the amount of such untransmitted data is below such threshold, then only an amount of data equivalent to an integer fraction of that threshold is transmitted to the device. Additionally, the segmented transmission described above is repeatedly executed until it is determined that the amount of untransmitted data is greater than the threshold, in intervals of time shorter than that in which a device interface time out is generated.

It should be noted that the threshold value used in the determination made in step S1507 and the signal wait time used in step S1512 are determined by a preset interface time out prevention time and a preset device 614 interface time out time. For example, if the interface time out at the device is set to 1 minute, then the write completed event wait time in step S1512 is set to a value less than the device interface time out time (e.g., 40 seconds). It is preferable that the write completed event wait time be set substantially shorter than the device interface time out time. For example, if the write completed event wait time in step S1512 is 30 seconds and it is desired to prevent an interface time out for a period of 10 minutes (that is, 600 seconds), then the threshold should be set at 600÷30=20 bites. This value may be set uniformly for the entire printing system in light of the characteristics of the devices that the system supports and stored in the ROM 201, or it may be set individually for each device and stored in the ROM 201 or the HD 205. Moreover, a time out setting means that displays a time out setting screen and accepts user-inputted settings may be provided. In such cases, it is preferable that the time out setting for each device or for the entire system be stored in a non-volatile memory such as the HD 205.

Additionally, although in the foregoing description 1 bite of data is transmitted in step S1510 in order to prevent a time out, the present invention is not limited thereto but encompasses segmented transmission of other predetermined amounts of data (e.g., an amount equivalent to an integer fraction of the threshold). For example, if the amount of data transmitted in a single segment is 16 bites, then by setting the threshold to 320 bites the standby process of step S1512 is carried out 320÷16=20 times, even after the amount of data remaining in the transmission buffer falls below the threshold and there is no data whatsoever stored in the file. If the wait time for a single write finish event is 30 seconds, then 30×20=600 seconds, that is, a 10-minute interface time out interval.

It should be noted that although in the foregoing description the threshold is 1 and an algorithm that transmits 1 bite at a time when the amount of untransmitted data left in the transmission buffer is less than the threshold, the present invention is not limited thereto. Instead, an algorithm may be used that sets a plurality of thresholds, with the data divided into a variety of amounts depending on the data size.

In the event that the transmission of drawing data from the spooler 602 to the job control service port monitor 605 stalls even after the standby process of step S1512 is repeated, an interface time out between the device and the interface is generated. In this case, or when the device experiences a power failure and cannot accept data, the system detects an error in step S1509 or step S1511 and terminates the transmission process.

It should be noted that although in the present embodiment the re-sending of print data is accomplished by instruction from the user input via the job list screen shown in FIG. 11, the present embodiment is not limited thereto. Thus, for example, a program that monitors a job control print service 610 such as a print manager 611 may be configured so as to constantly monitor the job status and automatically issue a retransmit instruction after a job error occurs. Such a resend instruction to the port object 1209 may be issued a certain predetermined length of time after the occurrence of a job error, or it may be issued once generation of a job file for the job experiencing the error is finished.

Additionally, as can be appreciated by those of ordinary skill in the art, the present invention may be implemented by either a single device or by a system comprising a plurality of devices.

It should be noted that a software program for implementing the capabilities of the above-described embodiment, supplied either directly or indirectly from a recording medium or by using wire or wireless communications, to a system or apparatus having a computer capable of executing such program, the execution of such program by the computer of the system or apparatus achieving equivalent capabilities of the above-described embodiment is included in the present invention.

Accordingly, a program supplied to and installed in such a computer for the purpose of implementing the functional processes of the present invention itself achieves the present invention. That is, a computer program for implementing the processes performed by the present invention is itself with the scope of the present invention. In such a case, provided the program capabilities are present, the format of the program, whether executed by object code or by an interpreter, for example, does not matter.

The recording medium for supplying the program includes, but is not limited to, magnetic recording media such as a floppy disk, a hard disk or magnetic tape, optical or magneto-optical recording media such as MO, CD-ROM, CD-R, CD-RW, DVD-ROM, DVD-R or DVD-RW, or a non-volatile semiconductor memory.

Wire and wireless methods of supplying the program to the system or apparatus described above include, but are not limited to, a computer program that forms the present invention on a server on the computer network 106, or storing a data file (i.e., a program data file) that can become a computer program that forms the present invention on a Client, such as a compressed file with a self-installing capability, and downloading the program data file to a connected Client. In this case, the program data file can be divided into a plurality of segment files and the segment files disposed at different servers.

In other words, a server device that downloads to a plurality of users a program data file for implementing the function processes of the present invention by computer is also included with in the scope of the present invention.

As can be appreciated by those of ordinary skill in the art, the program of the present invention may be encrypted and stored on a recording medium such as a CD=ROM and distributed to users, with decryption data for decrypting the encryption being made available to users who fulfill certain conditions, for example, by downloading from a home page via the Internet, with the users then using the decryption data to execute the encrypted program for installation on a computer.

Additionally, as can be appreciated by those of ordinary skill in the art, in addition to implementing the capabilities of the above-described embodiments by reading out and executing the above-described program by computer, the above-described capabilities of the embodiments described above can also be implemented by OS software running on a computer and performing some or all of the actual processed described heretofore based on the program instructions.

Moreover, the present invention also includes an instance in which the above-described capabilities of the embodiments described above are achieved by processes executed in whole or in part by a CPU or the like provided in a function expansion card or a function expansion unit based on program code instructions, after the program code read from the recording medium is written to a memory provided in such a function expansion card inserted into the computer or such function expansion unit connected to the computer.

The present invention detects deterioration in picture quality due to the presence of defective toner and can prevent the formation of poor-quality images.

The present invention is not limited to the above-described embodiments, and various changes and modifications may be made thereto within the spirit and scope of the present invention. Therefore, in order to apprise the public of the scope of the present invention, the following claims are made.

What is claimed is:

1. A computer-readable storage medium storing a computer-executable print control program, the computer-executable print control program executed by an information processing apparatus that transmits print data to an image-forming device which records an image, the program comprising:

code for causing said information processing apparatus to execute a spooling step of further re-spooling, as a second spool file, print data spooled by an operating system as a first spool file;

code for causing said information processing apparatus to execute a transmission step of reading out and transmitting to the image-forming device the print data re-spooled as the second spool file, wherein said transmission step transmits to said image-forming device a portion of said print data which has already re-spooled as the second spool file while retaining the other portion in the case that re-spooling in said spooling step is stalled;

code for causing said information processing apparatus to execute a data amount detection step of detecting an amount of data in the second spool file, which is not transmitted to said image-forming device; and code for causing said information processing apparatus to execute a determination step of determining whether or not the amount of data detected by said data amount detection unit is below a predetermined threshold, wherein said transmission step transmits to said image-forming device the print data in the second spool file in segments if it is determined that the amount of data is below the threshold, and wherein said transmission unit transmits the print data to said image-forming device if it is determined that the amount of data is equal to or more than the threshold.

2. The computer-readable storage medium storing a computer-executable print control program according to claim 1, wherein the program further comprises:

code for causing said information processing apparatus to execute an attaching step of attaching to the print data re-spooled in said spooling step a first job identifier and a second job identifier different from the first job identifier; and code for causing said information processing apparatus to execute a managing step of managing jobs based on the second job identifier.

3. The computer-readable storage medium storing a computer-executable print control program according to claim 2, wherein the first job identifier is an identifier issued via the operating system.

4. The computer-readable storage medium storing a computer-executable print control program according to claim 1, wherein said transmission step comprises a segmented transmission step in which print data in the second spool file is divided and transmitted to said image-forming device in segments.

5. The computer-readable storage medium storing a computer-executable print control program according to claim 4, wherein:

said transmission step comprises a write finish detection step of detecting an end of spooling of the second spool file in said spooling step; and in said segmented transmission step the print data in the second spool file is transmitted to said image-forming device in segments if the second spool file write finish is not detected in said write finish detection step.

6. The computer-readable storage medium storing a computer-executable print control program according to claim 1, wherein said data transmission step is repeatedly executed at intervals shorter than that in which an interface time out is generated at said image-forming device, until the amount of data is determined in said determination step to be above the threshold.

7. The computer-readable storage medium storing a computer-executable print control program according to claim 1, further comprising a retransmission step of retransmitting to said image-forming device said print data re-spooled as the second spool file in said spooling step before the re-spooling in said spooling step is finished if transmission to said image-forming device of the print data is stalled.

8. The computer-readable storage medium storing a computer-executable print control program according to claim 7, wherein said retransmission step comprises:

a display step of displaying a status of said print data re-spooled as the second spool file in said spooling step; and if print data for which transmission to said image-forming device is interrupted due to error is displayed in said display step, an accepting step of accepting an instruction to retransmit such print data.

9. The computer-readable storage medium storing a computer-executable print control program according to claim 8, wherein said retransmission step further comprises an identification step of identifying print data for retransmission using the second job identifier.

10. An information processing apparatus for transmitting print data to an image-forming device which records an image, the apparatus comprising:

a spooling unit for further re-spooling, as a second spool file, print data spooled by an operating system as a first spool file and then once de-spooled; and a transmission unit for reading out and transmitting to said image-forming device said print data re-spooled as the second spool file, wherein said transmission unit transmits to said image-forming device a portion of said print data which has already re-spooled as the second spool file while retaining the other portion in the case that re-spooling by said spooling unit is stalled;

a data amount detection unit for detecting an amount of data in the second spool file, which is not transmitted to said image-forming device; and a determination unit for determining whether or not the amount of data detected by said data amount detection unit is below a predetermined threshold, wherein said transmission unit transmits to said image-forming device the print data in the second spool file in segments if it is determined that the amount of data is below the threshold, and wherein said transmission unit transmits the print data to said image-forming device if it is determined that the amount of data is equal to or more than the threshold.

11. The information processing apparatus according to claim 10, further comprising:

an attaching unit for attaching to the print data re-spooled by said spooling unit a first job identifier and a second job identifier different from the first job identifier; and a managing unit for managing jobs based on the second job identifier.

12. The information processing apparatus according to claim 11, wherein the first job identifier is an identifier issued via the operating system.

13. The information processing apparatus according to claim 10, wherein said transmission unit comprises a segmented transmission unit for dividing and transmitting print data in the second spool file to said image-forming device in segments.

14. The information processing apparatus according to claim 13, wherein:

said transmission unit comprises a write finish detection unit for detecting an end of spooling of a spool file by said spooling unit; and said segmented transmission unit transmits the print data in the second spool file to said image-forming device in segments if a spool file write finish is not detected by said write finish detection unit.

15. The information processing apparatus according to claim 10, wherein said transmission unit repeatedly executes data transmission at intervals shorter than that in which an interface time out is generated at said image-forming device, until the amount of data is determined by said determination unit to be above the threshold.

16. The information processing apparatus according to claim 10, further comprising a retransmission unit for retransmitting to said image-forming device said print data re-spooled as the second spool file by said spooling unit before the re-spooling by said spooling unit is finished if transmission to said image-forming device of the print data is stalled.

17. The information processing apparatus according to claim 16, wherein said retransmission unit comprises:

a display unit for displaying a status of said print data re-spooled as the second spool file by said spooling unit; and if print data for which transmission to said image-forming device is interrupted due to error is displayed by said display unit, an accepting unit for accepting an instruction to retransmit such print data.

18. The information processing apparatus according to claim 17, wherein said retransmission unit further comprises an identifier for identifying print data for retransmission using the second job identifier.

* * * * *